2 Sheets--Sheet 1.
T. CASTOR.
Street-Cars.
No. 6,061. Reissued Sept. 22, 1874.
FIG. I.
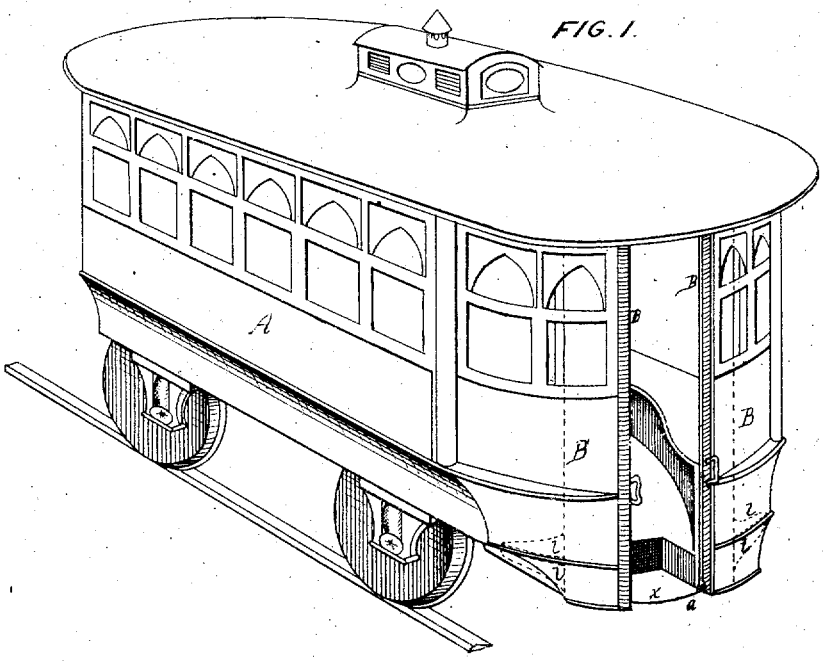
FIG. II.
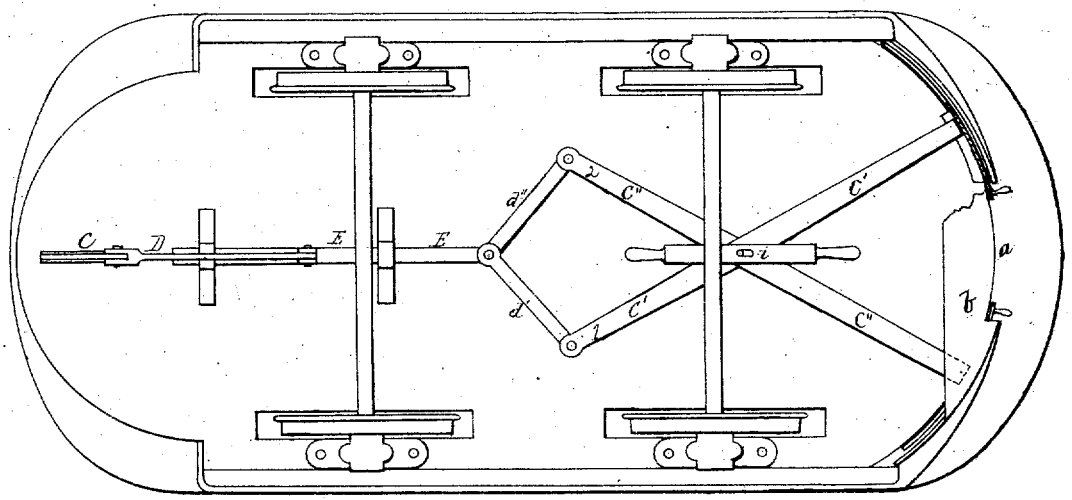
WITNESSES:
D. G. Stuart
M. Knight
INVENTOR:
Thos. Castor
per D. Hannay
Attorney
THE GRAPHIC CO. PHOTO-LITH. 39 & 41 PARK PLACE, N.Y.

2 Sheets--Sheet 2.
T. CASTOR.
Street-Cars.
No. 6,061.
Reissued Sept. 22, 1874.
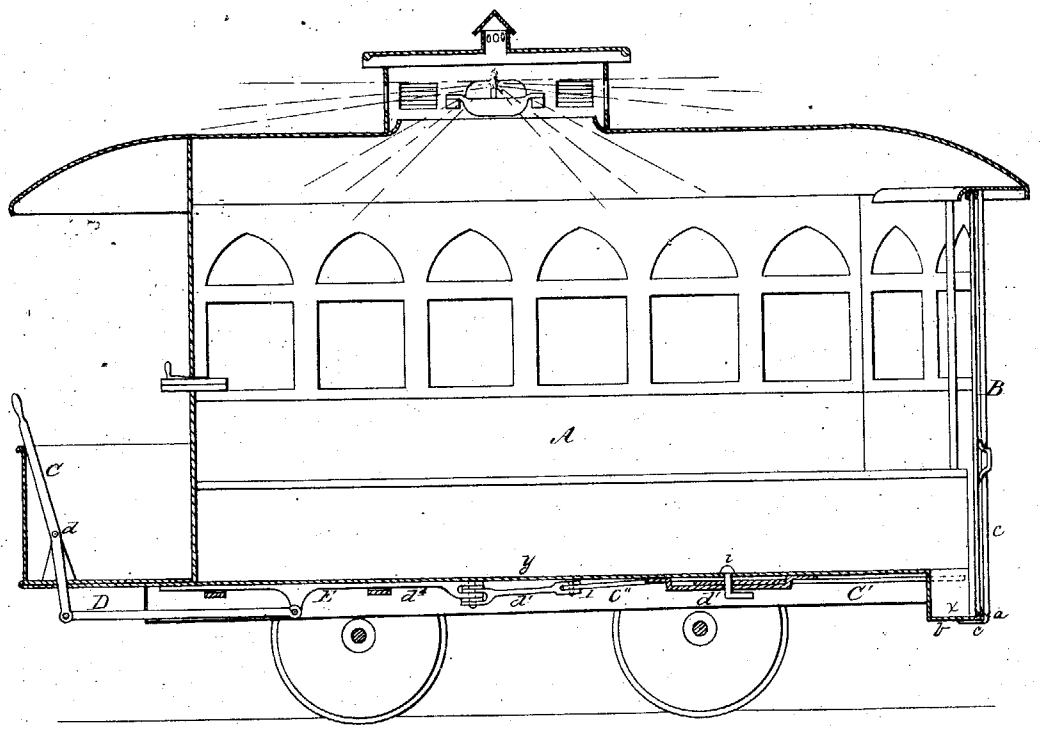
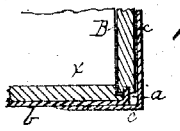
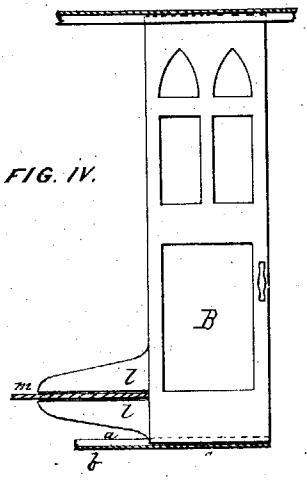
WITNESSES:
D. L. Stuart
G. F. Knight
INVENTOR:
Thos. Castor
per
S. Hannay
Attorney
THE GRAPHIC CO. PHOTO-LITH. 39 & 41 PARK PLACE, N.Y.

UNITED STATES PATENT OFFICE.

THOMAS CASTOR, OF PHILADELPHIA, PENNSYLVANIA, ASSIGNOR, BY MESNE ASSIGNMENTS, TO JOHN STEPHENSON, OF NEW YORK CITY.

IMPROVEMENT IN STREET-CARS.

Specification forming part of Letters Patent No. 32,681, dated July 2, 1861; reissue No. 6,061, dated September 22, 1874; application filed August 3, 1874.

DIVISION E.

*To all whom it may concern:*

Be it known that I, THOMAS CASTOR, of Philadelphia, in the State of Pennsylvania, have invented certain new and useful Improvements in the Mode of Constructing and Operating the Entrance-Doors of City Passenger Railway-Cars, of which the following is a description, reference being had to the accompanying drawings, which make part of this specification, and in which—

Figure 1 represents a view in perspective of a street-car having my improvements applied thereto, showing the rear or entrance end of the car. Fig. 2 represents a plan of the bottom of the car, showing one mode of connecting the rear door with the operating-lever on the front platform, by means of which the driver, at will, can open or close the entrance to the car. Fig. 3 represents a vertical longitudinal section of the car, showing details; and Figs. 4 and 5, detail sections of the door and its adjuncts.

My invention, so far as this division of my original patent is concerned, relates solely to a new and improved mode of opening and closing the entrance of the car, by which the full control of the car is placed in the hands of the driver, and the services of a conductor entirely dispensed with.

Heretofore, in running one class of street-cars, as formerly constructed, it was found necessary to employ conductors for the two-fold purpose of collecting the fare and of opening and closing the entrance-door of the car, for the ingress and egress of passengers. By this plan the receipts of the car are chargeable, as well for his services as his peccadilloes, either of which, taken singly, is sufficiently onerous, but, when taken together, utterly ruinous.

Another mode, and but recently introduced, is to dispense with the conductor, and collect the fare by the use of a fare-box. This plan, while it saves the expense of the conductor, is still subject to the objection that the passengers are required to open and close the door for themselves, and which, in numerous cases—as, for instance, in the cases of small children, ladies, or people in delicate health—they are wholly unable to do; but, beyond this, it is subject to a graver objection, as it leaves the control of the entrance-door of the car in the hands of the passengers, to the great detriment, at times, of its proprietors, and of the public peace, by the unrestricted entrance given to disorderly and drunken persons.

To remedy these difficulties is the object of my invention; and its nature consists in placing the entrance-opening of the car under the immediate and complete control of the driver, and that in such manner that, while attending to his duties as collector of fares and as driver in front of the car, he can, at will, open or close the entrance to the car, suitable devices for effecting these purposes being arranged to his hand and connected with the door.

To accomplish this object in a simple yet effective way, and with the least amount of labor and of motion in opening and closing the entrance to the car A, I prefer to employ double sliding doors, B B, and as they are necessarily narrow I extend supporting guide-arms from their inner side, and thus make them slide or move steadily and evenly upon their ends. For this purpose the doors are made to rest, at their lower end, upon a rail or way, *a*, secured to or formed on the outer edge of a supporting cross-beam, *b*, which is made fast to the under side of the floor of the rear end of the car. This supporting-beam *b* is suspended in a horizontal plane below the level of the bottom *y* of the car, that the mechanism through which the driver operates the door may be properly attached or secured to its lower end. Moreover, the beam is so arranged as that its outer edge, on which the rail or way *a* is formed, shall preferably lie within the outer walls of the rear end of the car, that a vertical support may be given to the door.

Complying with these conditions, the beam may be secured to the bottom of the car in any suitable known way. One mode of fulfilling these conditions is represented in Fig. 5 of the drawings, in which the beam is represented as being secured to the bottom of the lower step *x*, which leads to the interior of the car, and to the lower end of the walls *c*, which inclose the steps.

The entrance-doors B B are made to slide on the rail *a* on the inside of the exterior wall of the rear end of the car, for which purpose a recess or channel is formed on each side of the entrance of the car by arranging a guide wall or frame on the inside of and at a suitable distance from the outer wall. Into this channel thus formed the door is fitted so as to slide freely out and in, as required. The top of each door is also provided with a guide-groove at the top of the car so as to hold them steady and in a vertical plane. To prevent tipping, the inner side of each door, near its lower end, is provided with a forked arm, *l*, the open ends of which embrace the outer edge of a thin flat guide-plate, *m*, Fig. 4, arranged in a horizontal plane, and secured to the under side of the rear end of the floor. The outer ends of the forked arm are bent slightly in toward the interior of the car, so as to embrace the outer edge of the guide-plate *m*, and which they otherwise could not do.

Thus arranged and supported, each door is ready to be attached or secured to the mechanism by which the driver can operate them, so as to open or close the entrance to the car.

In Figs. 2 and 3 a suitable mode is shown by which that object can be effected, and is especially adapted to a car having a round end, provided with doors, guideways, supporting-beam *b*, and way or rail *a*, of conformable shape, and which I will now proceed to describe, here recalling the fact that the lower end of the doors may project beneath and rest on a supporting-rail arranged in a plane beneath the level of the bottom of the floor, that the operative mechanism may be suitably attached thereto.

Upon the front or driver's platform is arranged a lever, C, and moves upon a fulcrum, *d*. The lower end of this lever is connected by means of a link-rod, D, and slide-lever, E, to one end of each of the two link-levers *d′* and *d″*, the other ends of which are respectively and pivotally connected to an end of the two pivoted levers C′ and C″, the other ends of which are also respectively connected to one of the slide-doors B B. These levers C′ C″ are mounted on a common fulcrum, *i*, in the manner shown in Figs. 2 and 3.

Thus connected, the operation of opening and closing the entrance to the car is as follows: The driver, by moving the lever C toward the body of the car, draws the ends 1 and 2 of the pivoted levers C′ C″ together by means of the slide-rods D and E and link-levers *d′* and *d″*, and thus forces the doors B B over the entrance-opening of the car. By reversing the motion of lever C the doors are withdrawn from over the entrance-opening.

The doors, it will be apparent, will move more readily when made to move in a circle than when made to move in a straight line; but such is not essential.

If a square ended car is used, the guide-way, supporting-rail, and door or doors must all be of conformable shape, in which case the levers C′ and C″ should be connected with the door by means of a link-connection. Moreover, the lever C upon the front platform may be connected with the doors by any other known combination of levers or devices which will give the desired motion.

The steps of the car illustrated in the drawings are represented as being arranged within the outer wall of the rear end of the car, and the door, being extended down, covers them. This arrangement prevents persons from getting in and out of the car without the knowledge of the driver, and thus prevents accidents which might otherwise happen, and at the same time gives him perfect control over the passengers, so that no surreptitious riding can occur without his consent and connivance.

Having thus described my improvements, what I claim as new, and desire to secure by Letters Patent, is—

1. The combination of a street-car body, rear entrance door or doors, and mechanism for opening and closing the latter from the front of the car, substantially as set forth.

2. The combination of a street-car body, rear entrance door, a pivoted lever, C′ or C″, and intervening device or devices, whereby, through power suitably applied at the front end of the car, the door may be opened or closed, as set forth.

3. The combination of a street-car body, provided with a rear entrance door or doors, and a lever in front suitably connected with said door, for the purposes set forth.

4. The combination of a street-car body, rear double doors, two levers, C′ C″, suitably connected with the doors, and a lever in front, substantially as and for the purposes set forth.

5. The combination of a lever at the front end of the car with an entrance door or doors at its rear and intervening device or devices, substantially as and for the purposes set forth.

6. The combination of a street-car body with rear entrance sliding door or doors and mechanism for opening and closing the latter from the front of the car, substantially as and for the purposes set forth.

7. The combination of a lever, C, a street-car body, and rear entrance sliding door or doors, provided with an extension or attachment to project below the line of the floor, to form suitable connections on the under side of the floor between the lever and the door or doors, substantially as set forth.

8. The combination of a street-car body, rear entrance sliding door or doors, and a supporting-rail, *e*, below the level of the floor, substantially as and for the purposes set forth.

9. The combination of a street-car body with rear entrance sliding door or doors, supporting-rail *e*, and mechanism for opening and closing the door or doors from the front of the car, substantially as set forth.

THOS. CASTOR.

Witnesses:
WM. HALL WAXLER,
DANIEL R. HART.